E. B. BUILTA.
CULTIVATOR.
APPLICATION FILED NOV. 13, 1911.
1,022,354.
Patented Apr. 2, 1912.
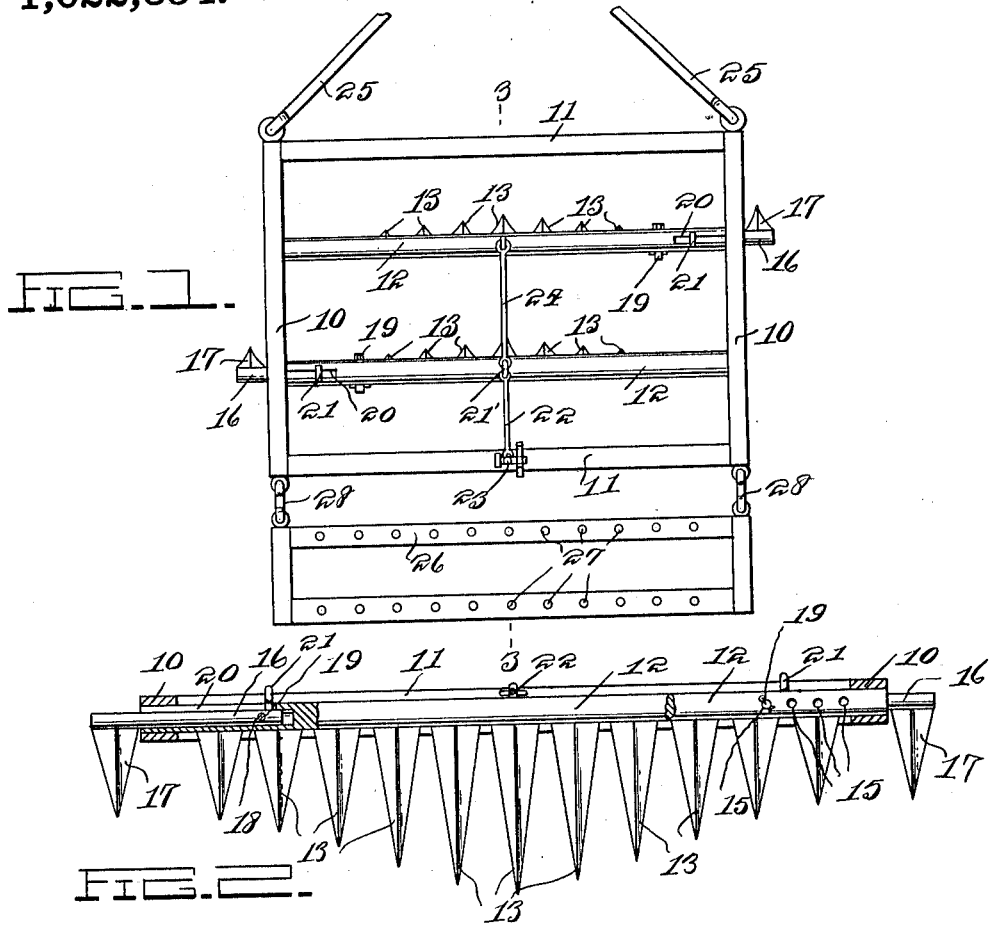
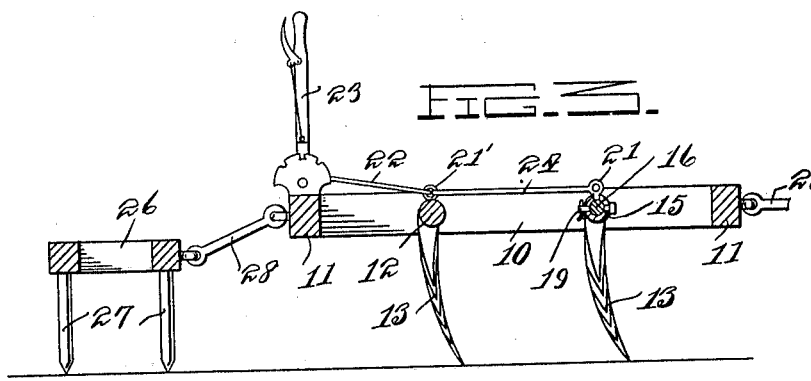
Witnesses
J. W. Taylor
Harry M. Test
Inventor
E. B. Builta.
By Harry Elles Chandler
Attorney

UNITED STATES PATENT OFFICE.

ELTON B. BUILTA, OF ARROWSMITH, ILLINOIS.

CULTIVATOR.

1,022,354.  Specification of Letters Patent.  Patented Apr. 2, 1912.

Application filed November 13, 1911. Serial No. 660,009.

*To all whom it may concern:*

Be it known that I, ELTON B. BUILTA, a citizen of the United States, residing at Arrowsmith, in the county of McLean and State of Illinois, have invented certain new and useful Improvements in Cultivators, of which the following is a specification.

This invention relates to improvements in cultivators and is particularly adapted for cultivating corn after the corn is too large to permit of the use of the ordinary cultivator.

In some sections of the country the farmers use an old wheel from a mowing machine and drag the same down between the rows of standing corn, but this does not do the work as well as it should be done, and for this purpose I have devised this device.

The device consists principally of the frame having a plurality of transversely arranged bars having secured thereto a number of teeth the teeth in the center of the bar being longest and decreasing in length toward both ends of the bars. The device 25 also includes the marking teeth to gage the width between the rows.

Other objects and advantages will be apparent from the following description and with particular reference to the accompanying drawings.

In the drawings: Figure 1 is a top plan view of my device. Fig. 2 is a rear end elevation of the same partly broken away. Fig. 3 is a section on the line 3—3 of Fig. 1.

Referring particularly to the drawings, 10 represents the side bars and 11 the front and rear bars of the device. Rotatably mounted at either ends in the said bars 10 are the teeth bars 12, which have the depending teeth 13 secured thereto, the central tooth being the greatest length, and each succeeding tooth on either side thereof being smaller than the preceding tooth so that the device will dig deepest at its center between the rows of corn, and of sufficient depth near the corn to loosen the soil but to avoid tearing the roots. One end of one of the bars 12 is hollow as at 14 and is formed with a series of transversely alining openings 15. Positioned in this hollow portion of the bar is a stub shaft 16 carrying on its outer end a long tooth 17. In the inner end of the stub shaft 16 is formed an opening 18 so that the bolt 19 may be passed through any pair of the alining openings 15 and through the openings 18 to adjust the shaft 16 at various distances relative to the end of the bar. The hollow portion of the bar 12 is also formed with an open ended slot 20 through which projects an eye bolt 21 which is secured in the shaft 16. Attached to the eye member is a link 22 which extends toward the front of the machine and is attached to a lever 23 by means of which the bars 12 may be set at various angles, the links 24 connecting the bars so that they will turn in unison. The other end of another one of the bars is formed similarly to that just described, and has the tooth 17. By means of the adjustment of the shaft 16 the distance between the rows may be gaged so that the device may be readily drawn therebetween. The forward part of the machine is provided with the usual draft device 25 to which a horse is adapted to be hitched.

At the rear of the device is a frame 26 provided with a series of spike teeth 27, said frame being attached to the frame 11 by means of the links 28. It will thus be seen that when the device is drawn down between the rows of corn the soil will be properly loosened, to the greatest depth in a line midway between the rows so that a trough-like structure will be formed which will greatly facilitate the irrigation of the corn, and by means of the adjustments of the shafts 16 the device may be actively guided between the rows. The teeth 13 are curved longitudinally so that shovels are provided.

What is claimed is:

A cultivator comprising a rectangular frame, bars rotatably mounted in the frame, one end of certain of said bars being formed with a tubular portion, said tubular portion being formed with transversely alined openings in an open-ended slot, a shaft in the tubular portion, a bolt secured to the shaft and extending through said slot, said shaft being provided with an opening for registry with said alined openings, an adjusting bolt disposed in the alined openings and the openings in the shaft and one guiding tooth on said shaft and curved teeth on the said bars, said teeth diminishing in size from the center toward the opposite ends of the bars.

In testimony whereof I affix my signature, in the presence of two witnesses.

ELTON B. BUILTA.

Witnesses:
S. C. SCHOOLEY,
ORA FRANKEBERGER.